Patented May 8, 1923.

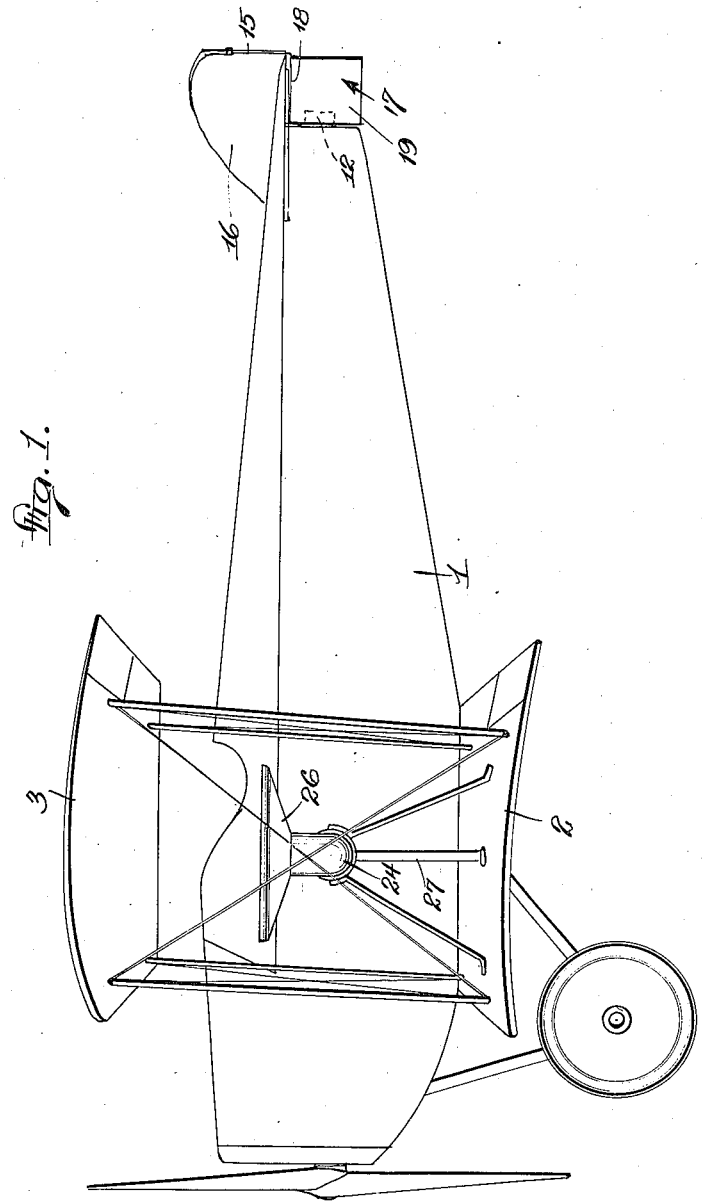

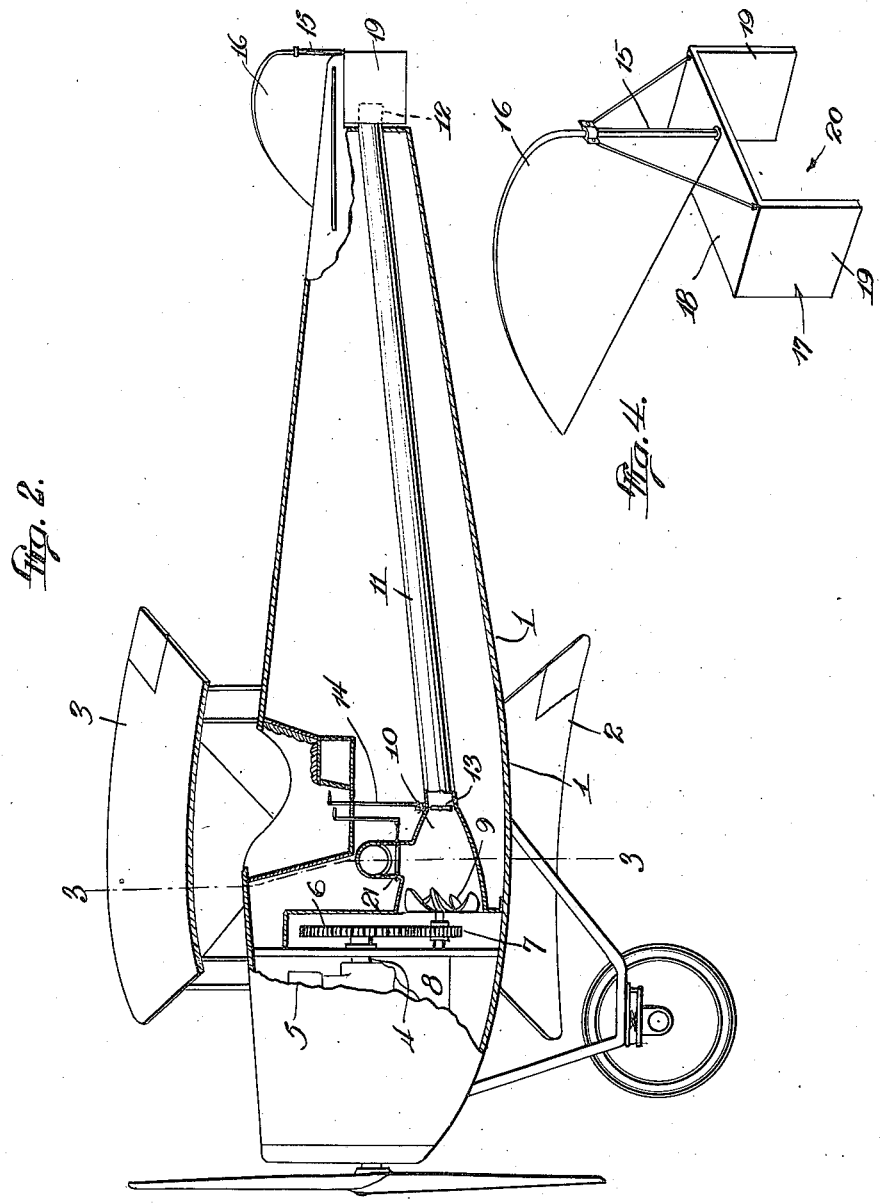

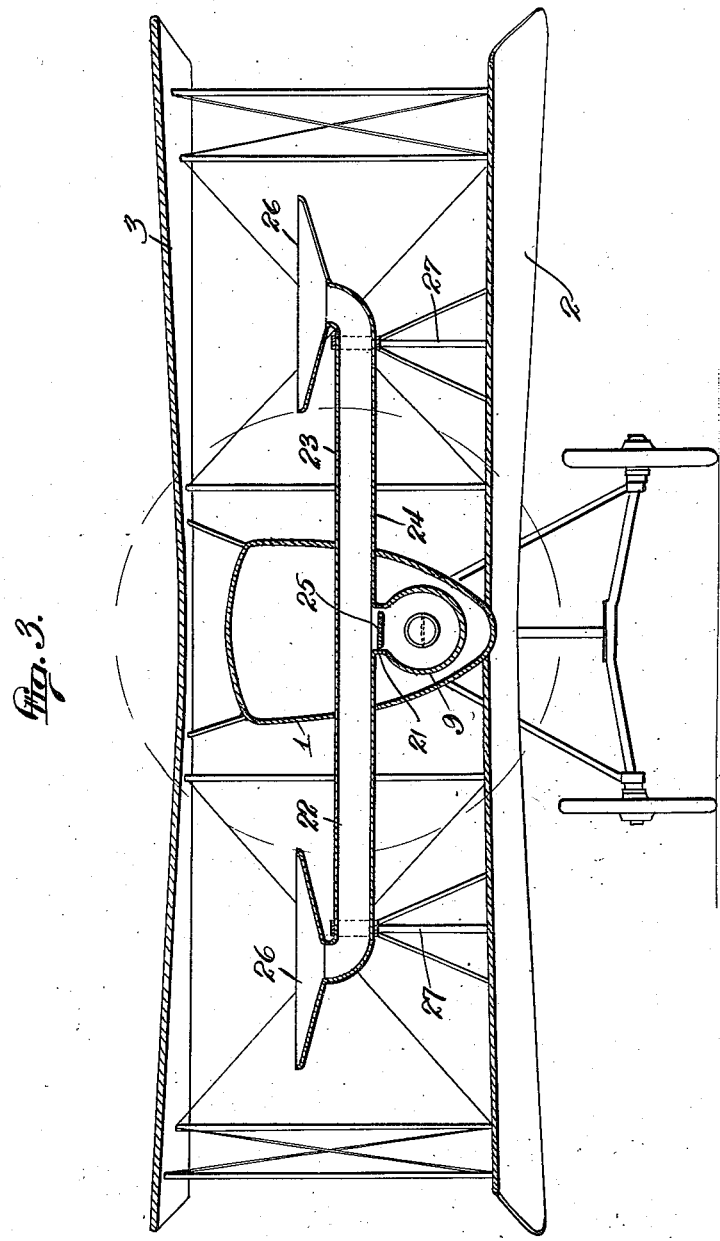

1,454,828

UNITED STATES PATENT OFFICE.

THOMAS H. BELL AND JOHN G. SCHOENLEBER, OF NEW YORK, N. Y.

AEROPLANE.

Application filed October 29, 1920, Serial No. 420,434. Renewed March 21, 1923.

*To all whom it may concern:*

Be it known that we, THOMAS H. BELL and JOHN G. SCHOENLEBER, citizens of the United States, residing at New York, in the county of New York and State of New York, have invented certain new and useful Improvements in an Aeroplane, of which the following is a specification.

This invention relates to an improvement in aeroplane construction and more particularly to a device for directing a powerful current of air against the upper planes of a biplane to facilitate lifting of the aeroplane when it arises from the ground.

Another object of the invention is to provide a current of air generated by a blower or fan connected with the motor of the aeroplane whereby a proper guiding and stabilizing of the aeroplane will be accomplished while in flight.

Other objects of the invention will appear upon consideration of the following detail description and accompanying drawings, wherein:—

Figure 1 is a side elevation of an aeroplane showing the invention mounted thereon, Figure 2 is a longitudinal section, parts being shown in elevation to illustrate the application of the invention to the aeroplane, Figure 3 is a transverse section taken on the line 3—3 of Fig. 2, and Figure 4 is a detail perspective view of a portion of the tail structure.

Referring to the drawings by numerals, the fuselage 1 is of the usual construction and the lower plane 2 and upper plane 3 are connected and braced in the usual manner. In this connection it should be understood that the invention is adapted for application to any type of aeroplane and should be arranged so that it may be installed by making suitable minor changes in the details of construction.

Mounted on the crank shaft 4 of the motor 5 is a driving gear 6 which meshes with a pinion 7 on the fan shaft 8. The fan or blower 9 is mounted on the end of the fan shaft and is disposed in the large end of a hood 10. The hood 10 is arranged within the body or the fuselage of the aeroplane and is of tapered formation as shown. The restricted end of the hood 10 is connected to a conduit 11 which extends rearwardly through the fuselage to the tail structure where the end of the conduit or pipe 11 is extended out through the end of the tail structure and has its terminal 12 approximately in longitudinal alinement with the center of the propeller shaft as shown to advantage in Fig. 2. A gate valve 13 is located in the end of the hood so that the entrance to the conduit pipe 11 may be opened and closed by the manual manipulation of a hand lever 14 connected to the valve 13.

The detail construction of the tail piece is shown in Fig. 4 and it will be noted that it includes a standard 15 to which is connected the rudder 16. The standard 15 supports a guide member 17 which comprises a horizontal plate 18 extending transversely across the tail of the machine and provided with a depending blade or fin 19 at each end so that a relatively wide space 20 is provided between the blades 19. The end 12 of the pipe 11 is partially extended into this space so that when the air is emitted from the end of the pipe, the blades 19 tend to prevent swaying of the tail structure by virtue of the contact with the powerful current of air emitted from the end of the pipe 11.

Extending upwardly from the hood is a conducting pipe 21 which communicates with oppositely extending portions 22 and 23 of the pipe 24. The conducting pipe 21 is provided with a manually operated gate valve 25 so that air from the fan may be passed into or excluded from the pipe 24. The terminals of the pipe 24 are turned upwardly and each is provided with a flared outlet nozzle 26 disposed between the upper and lower planes as shown to advantage in Fig 3. Suitable brackets 27 are employed to support the ends of the pipe.

When the apparatus is in use, and the motor is running, a powerful current of air will be generated by the fan 9. When the machine is to take off, the gate valve 13 will be closed and the valve 25 will be opened so that the current of air will be directed through the pipe 24 and outwardly through the nozzles 26 thus exerting a powerful pressure against the lower surface of the uppermost plane 3. Attention is directed to the fact that the nozzles 26 are spaced apart for a distance greater than the spread of the propeller on the engine shaft so that when the propeller is operating and the nozzles 26 are emitting a current of air the machine will rapidly rise from the ground until the proper height is reached. The valve 25 will then be closed and the valve 13 opened so that the current of air will be directed through the pipe 11 and out through the blades 19 on the tail structure to assist in stabilizing the machine and prevent the natural swaying of the tail.

Minor changes may be made in the details of construction without departing from the spirit of the invention or the scope of the claims hereunto appended.

What is claimed is:—

1. In combination with an aeroplane of the biplane type, and a pair of vertically disposed transversely spaced blades included in the tail structure of the aeroplane of a fan, means to drive the fan from the aeroplane motor a hood embracing the fan and tapered rearwardly therefrom, a conduit connected to the hood and extending into the space between the said blades in the tail structure a second conduit, and a valve to direct the air from the blower out of the second conduit exclusive of the said first conduit during the initial start of the aeroplane.

2. In combination with an aeroplane of the biplane type, a fan, means to drive the fan from the aeroplane motor, a hood embracing the fan, a pipe extending from the hood lengthwise between the planes of the biplane and having its terminals turned upwardly at points beyond the outer end of the propeller of the aeroplane, and wide mouthed nozzles carried by the upturned ends of the said pipe and directed toward the bottom surface of the upper plane.

3. In combination with an aeroplane of the biplane type, a pipe extending longitudinally between the upper and lower planes of the biplane, means to support the ends of the pipe from the lower plane, the terminals of the said pipe being turned upwardly, a nozzle on each of the said upturned ends directed toward the lower surface of the upper plane, and means to direct a current of air through the said pipe and out through the said upturned nozzles.

In testimony whereof, we have affixed our signatures.

THOMAS H. BELL.
JOHN G. SCHOENLEBER.